United States Patent [19]

Masuda

[11] Patent Number: 4,587,379

[45] Date of Patent: May 6, 1986

[54] CARD AUTHENTICATING APPARATUS FOR CARD-BASED TRANSACTION PROCESSING SYSTEM

[75] Inventor: Kiyoshi Masuda, Osaka, Japan

[73] Assignee: Omron Tateisi Electronics Co., Kyoto, Japan

[21] Appl. No.: 592,979

[22] Filed: Mar. 23, 1984

[30] Foreign Application Priority Data

Mar. 24, 1983 [JP] Japan .................................. 58-49575

[51] Int. Cl.[4] .......................................... H04M 11/00
[52] U.S. Cl. ................................................ 179/2 CA
[58] Field of Search ........... 179/2 CA, 2 DP, 90 AD, 179/90 B, 90 BB, 90 BD, 90 CS; 340/825.31–825.35; 235/380, 381, 382, 382.5

[56] References Cited

U.S. PATENT DOCUMENTS 3,938,090 2/1976 Borison et al. ............... 179/2 CA X
4,277,651 7/1981 Fisher, II et al. ................. 179/90 B

FOREIGN PATENT DOCUMENTS 3035882 5/1982 Fed. Rep. of Germany ... 179/90 BB

Primary Examiner—W. J. Brady
Attorney, Agent, or Firm—Schwartz, Jeffery, Schwaab, Mack, Blumenthal & Evans

[57] ABSTRACT

A card authenticating apparatus for a card-based transaction processing system. A device is incorporated which allows a sales-person of a store equipped with the apparatus to automatically call a card controlling operator of a card issuer company for consultation as to completion of the transaction in concern, as occasion requires.

7 Claims, 5 Drawing Figures

CARD AUTHENTICATING APPARATUS FOR CARD-BASED TRANSACTION PROCESSING SYSTEM

BACKGROUND OF THE INVENTION

1. Field of the Invention

The present invention generally relates to a card authenticating apparatus installed at stores or shops subscribed for a card-based transaction system for allowing various transaction processings to be executed through verification or authentication of credit cards and communication with central units installed at card issuers.

2. Description of the Prior Art

In recent years, there are developed and adopted increasingly card-based transaction processing systems in which card authenticating or verifying apparatus are installed at shops or stores joining the card-based transaction system are connected to central apparatus installed at card issuing companies in charge of controlling or supervising the cards by way of telephone line for transmitting to the card issuer the data of the card with a view to rationalizing the transactions based on the card such as a credit card which carries data of card issuer identifying code, user identifying code, cipher and the like. In such card-based transaction processing systems, the sales-person is required to make decisions upon every transaction as to whether transaction with a card user is permitted or not. For example, when the monetary amount of transaction in concern exceeds a certain limit imposed on the user by a card issuer company, the sales-person will often be at a loss as to completion of the transaction or dealing. In such situations, the sales-person is compelled to call the operator (control personel) of the card issuer company to inquire of the operator's decision as to whether the transaction be authorized or not. To this end, the sales-person has to search for the operator's telephone number of the corresponding card issuer company for every inquiry, which is a very troublesome procedure and provides a cause for degrading the efficiency of transactions.

SUMMARY OF THE INVENTION

An object of the present invention is to provide a card authenticating apparatus for a card-based transaction processing system which is imparted with an automatic dialing function for automatically and selectively permitting communication with the respective operators of the card issuer companies as occasion requires, without requiring troublesome procedure, to thereby enhance significantly the efficiency of the card-based transaction processing.

In view of the above object, it is taught according to an aspect of the invention that the numbers of telephones for the exclusive use of operators of card issuer companies are previously stored in a memory, wherein a sales-person who is at a loss in deciding whether transaction in concern is to be completed or not is allowed to request communication with the operator in charge simply by designating the associated card issuer company through actuation of a corresponding key. To this end, a controller is provided for reading the operator's telephone number in concern from the memory for operating an automatic dialing unit correspondingly to thereby establish automatically the connection of a telephone line to the operator's set.

According to the invention, troublesome dialing procedure including the searching of operator's number of every card issuer company can be obviated, whereby the efficiency of the transaction processing on the side of the stores can be significantly increased.

BRIEF DESCRIPTION OF THE DRAWINGS.

FIG. 4(2) is a view for illustrating memory configurations; and

DESCRIPTION OF THE PREFERRED EMBODIMENTS

Figure 1:
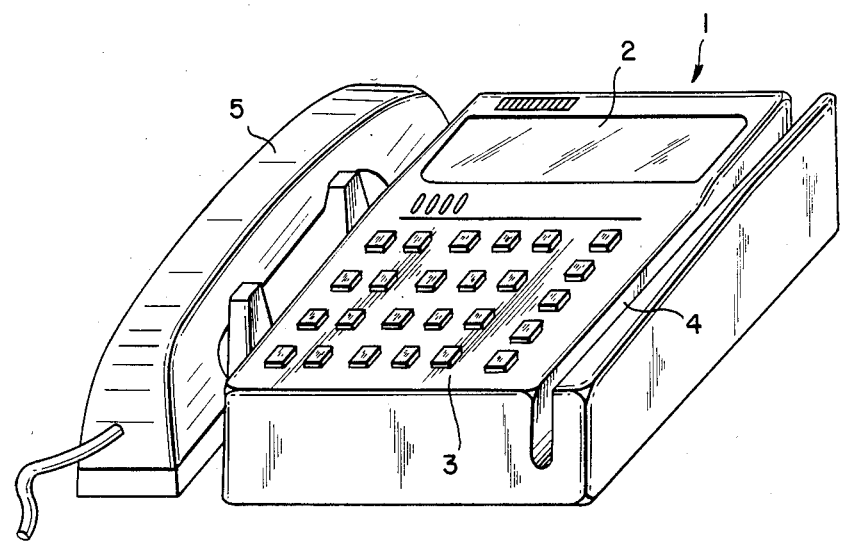
FIG. 1 is a perspective view showing a card authenticating apparatus to which the present invention is applied.

FIG. 1 shows in a perspective view a card authenticating apparatus for a card-based transaction processing system which apparatus is usually installed at retail store or shop. The card authenticating apparatus 1 as illustrated is provided at the top surface thereof with a display 2, a keyboard 3 and a card placing portion 4. A receiver 5 is provided on one side of the apparatus 1 for communication with control personel or operators of card issuing companies who are in charge of control of the card-based transactions.

Figure 2:
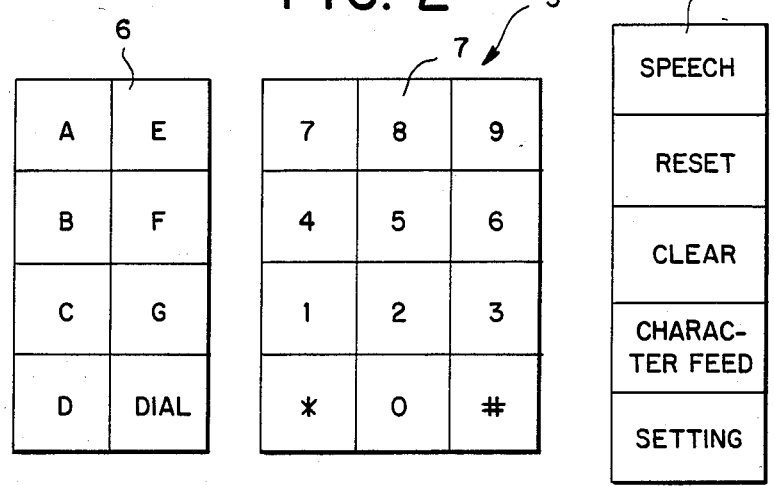
FIG. 2 is a top plan view showing a key array of a keyboard of the card authenticating apparatus.

The card placing portion 4 includes a groove in which a credit card is slidably inserted. A reading head of card reader is mounted adjacent to the groove for reading information or data carried by the card such as code identifying the card issuer company, code identifying the card user, cipher code, the term of validity and others. The keyboard 3 includes card issuer company designating keys 6 for indicating the card issuer companies represented by A, B, ... and G, respectively, and entry keys 7 for inputting the numbers and prices or monetary amounts, and communication keys 8 for permitting an automatic dialing (auto-dialing) operation to the control personel or operator of the card issuer company, as is shown in FIG. 2.

Figure 3:
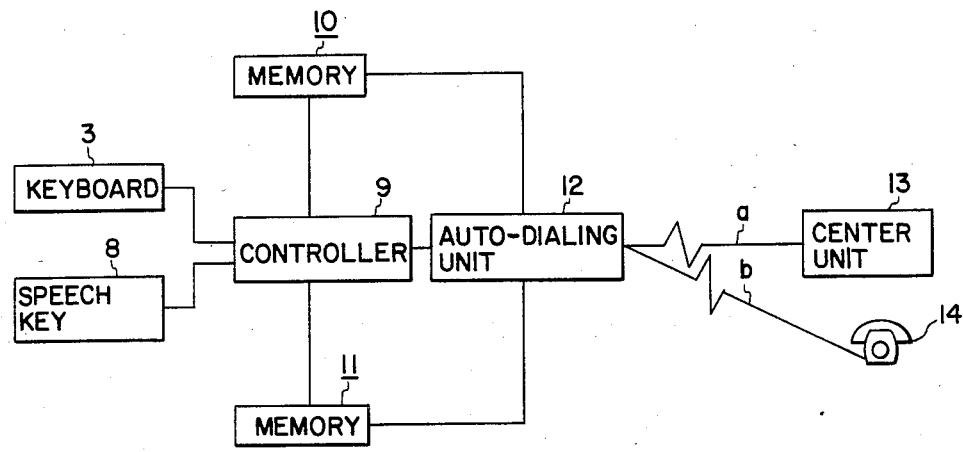
FIG. 3 is a block diagram showing a general circuit arrangement of the card authenticating apparatus according to an embodiment of the invention.
Figure 4:
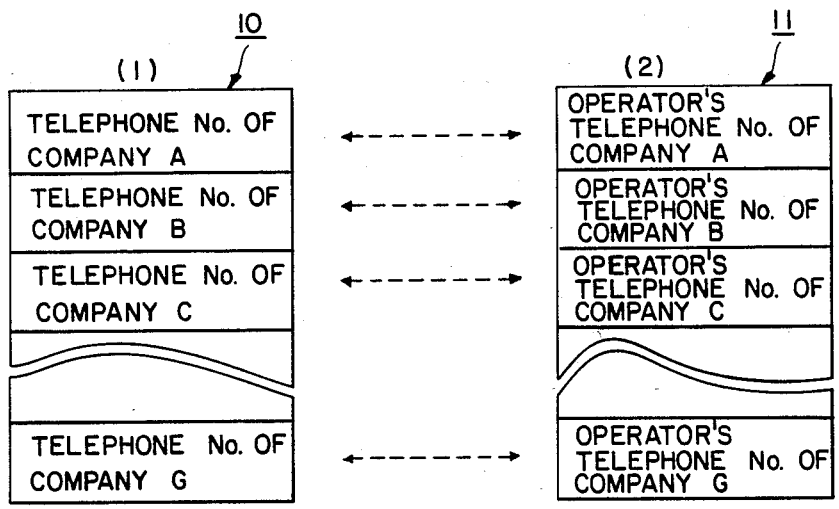
FIG. 4(1) is a view for illustrating memory configurations.

FIG. 3 shows a circuit arrangement of the card authenticating apparatus. In FIG. 3, a controller 9 is constituted by a computer including a central processing unit, a read-only memory or ROM, a random access memory or RAM and the like. On the basis of the program stored in the ROM, writing or reading of data to or from the RAM as well as reading of data from first and second telephone number memories 10 and 11 is executed through the controller 9 which additionally controls input/output operations brought about by the key arrays 3, the communication keys 8 and the automatic dialing unit 12. The first telephone number memory 10 stores therein the telephone numbers of the card issuing companies, as is shown in FIG. 4 at (1) while the second telephone number memory 11 stores therein the numbers of the operator-only telephones for the exclusive use of the operators of the card issuing companies, respectively, as is shown in FIG. 4 at (2). On the basis of these stored telephone numbers, the automatic dialing unit 12 establishes automatically a telephone line a or b to a central unit 13 of the card issuer company or the operator-only telephone 14 of that company in accordance with the input through the keys 6 or 8.

Figure 5:
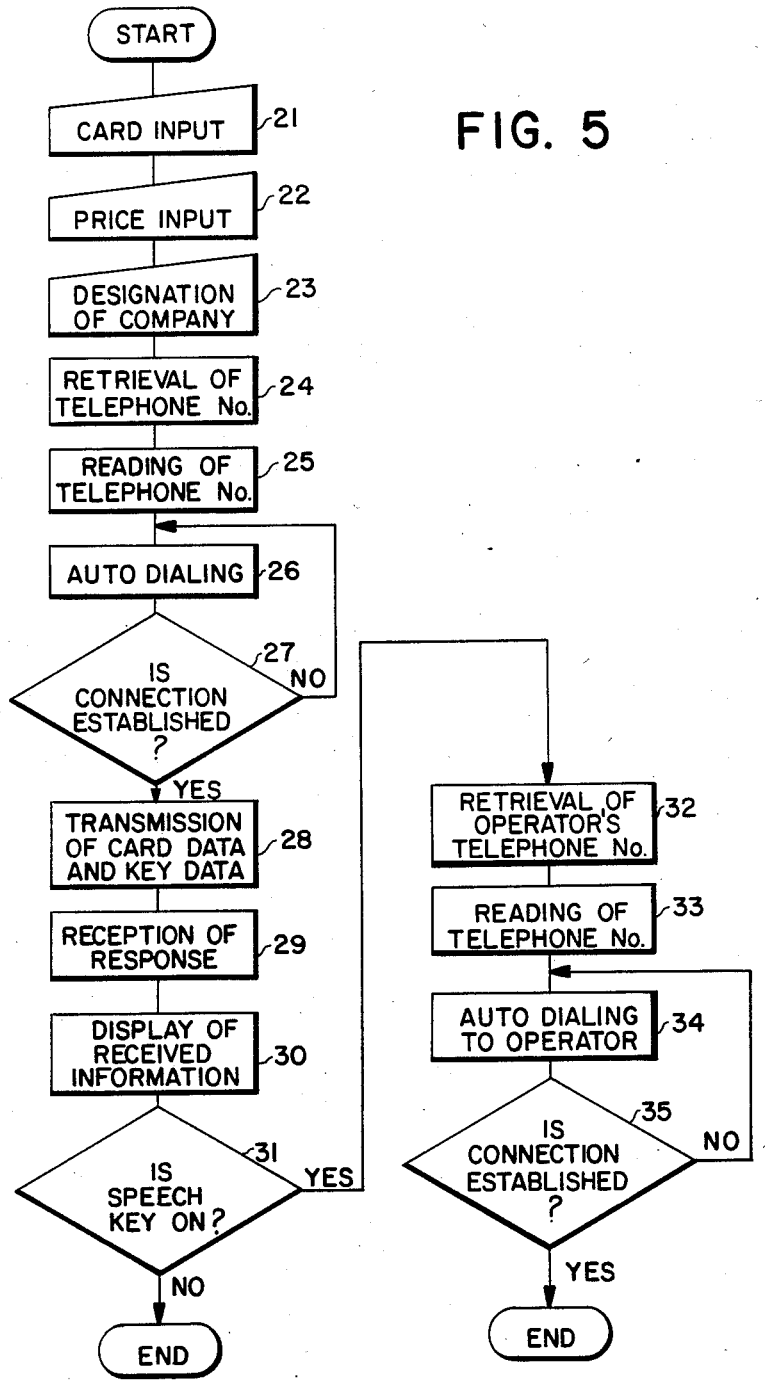
FIG. 5 is a flow chart for illustrating operations of the card authenticating apparatus.

FIG. 5 illustrates in a flow chart a flow of processings executed by the controller 9. At a step 21, a credit card is loaded in the card authenticating apparatus 1. At a step 22, the price or monetary amount of transaction is inputted. At a step 23, the relevant company designating key 6 is operated, which is followed by a step 24 at which the corresponding telephone number is retrieved from the memory 10. At a succeeding step 25, the telephone number of the card issuer company is read out. Subsequently, in step 26, the automatic dialing unit 12 is actuated in accordance with the telephone number as read out, whereby connection of the telephone line a to the central unit of the corresponding card issuer company is established. Under the condition, the result of the succeeding decision step 27 where it is determined whether or not the telephone connection is established will be affirmative "YES". At the next step 28, the data read from the card together with the key-input data are transmitted to the central unit 13 by way of the telephone line a. Upon reception of the message from the central unit 13 at a step 29, the contents of the message are displayed in the display 2.

It is assumed that a salesperson feels it necessary to inquire a card issuer company of whether the transaction is permitted or not. Then, the communication key 8 labelled "SPEECH" is actuated. Then, the decision step 31 in which the card authenticating apparatus determines whether the salesperson has requested communication with an operator at the card issuing company by depressing SPEECH key 8, results in "YES", whereby the retrieval of the telephone number memory 11 is performed at the succeeding step 32, which is followed by the step 33 at which the operator-only telephone number of the corresponding company is read out. At the next step 34, the automatic dialing unit 12 is operated in accordance with the telephone number as read out, whereby the connection of the telephone line b to the operator-only telephone 14 is established. Accordingly, the decision step 35 wherein it is determined whether a telephone connection has been established results in "YES". The salesperson is then allowed to make communication with the operator to inquire the latter of the authorization of the transaction in concern.

The means for requesting the communication with the operator of the card issuer is not restricted to the communication key array 8 of the illustrated embodiment. Other appropriate means such as a hook switch provided in combination with a hook for the receiver 5 may be used for actuation or control of the automatic dialing unit 12.

Although the invention has been described in conjunction with an exemplary embodiment shown in the accompanying drawings, it should be understood that many modifications and variations will readily occur to those skilled in the art without departing from the spirit and scope of the invention set forth in claims.

What is claimed is:

1. A card authenticating apparatus for a card-based transaction processing system comprising:
   (a) means for designating a given one of card issuers who corresponds to a card placed in said card authenticating apparatus;
   (b) means for producing a command requesting communication with an operator of said card issuer;
   (c) first memory means for storing data representing the telephone numbers of center units of said card issuers;
   (d) second memory means for storing operator telephone numbers of said card issuers;
   (e) automatic dialing means for automatically and selectively establishing connection of a telephone line to said operator's telephone of said designated card issuer or a center unit of said designated card issuer and;
   means for controlling operation of said automatic dialing means wherein said controlling means activates said automatic dialing means to read out a center unit telephone number of said designated card issuer from said first memory means when said designating means is enabled; and
   wherein said controlling means activates said automatic dialing means to read out an operator telephone number of said designated card issuer from said second memory means when said command requesting means is enabled.

2. A card authenticating apparatus set forth in claim 1, wherein said communication request commanding means comprises corresponding keys arrayed in a keyboard of said apparatus.

3. A card authenticating apparatus set forth in claim 1, wherein said communication request commanding means comprises a hook switch provided in association with a hook for a receiver of said card authenticating apparartus.

4. A method of processing card-based transactions comprising the steps of:
   (a) inserting a user card into a card authenticating apparatus;
   (b) inserting transaction data into said card authenticating apparatus;
   (c) determining a designated card issuer based on data encoded on said user card;
   (d) automatically establishing communication with a central unit of said designated card issuer;
   (e) receiving transaction information from said designated card issuer;
   (f) terminating said transaction if said information is of a first state;
   (g) automatically establishing communication with an operator of said designated card issuer if said information is of a second state; and
   (h) terminating said transaction.

5. The method of claim 4, wherein step (d) further comprises;
   (i) retrieving a telephone number of said central unit from a memory means in said authenticating apparatus;
   (ii) actuating an automatic dialing means so as to dial said telephone number, thereby establishing communication with said central unit.

6. The method of claim 4, wherein step (g) further comprises;
   (i) determining if a command switch is in a first state;
   (ii) retrieving a telephone number of said operator from a memory means in said card authenticating apparatus if said command switch is in a first state;
   (iii) actuating an automatic dialing in said card authenticating apparatus so as to dial said telephone number, thereby establishing communication with said operator.

7. The method of claim 4, wherein the data of step (b) is a price.

* * * * *